L. P. REICHERT.
Bird-Cage.

No. 161,275.

Patented March 23, 1875.

WITNESSES:
John B. Edmonds
Thomas Edmonds

INVENTOR:
Louis P. Reichert
by Michael J. Stark
Attorney

UNITED STATES PATENT OFFICE.

LOUIS P. REICHERT, OF BUFFALO, NEW YORK.

IMPROVEMENT IN BIRD-CAGES.

Specification forming part of Letters Patent No. 161,275, dated March 23, 1875; application filed December 29, 1874.

*To all whom it may concern:*

Be it known that I, LOUIS P. REICHERT, of Buffalo, in the county of Erie and State of New York, have invented a new and Improved Lock-Hook; and I do hereby declare that the following is a full, clear, and exact description of the same, reference being had to the accompanying drawing, forming part of this specification, in which—

Figure 1:
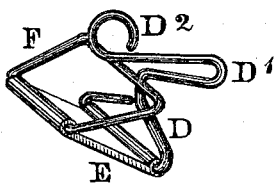
Figure 2:
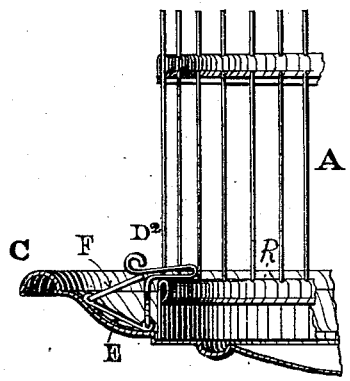

Figure 1 is a perspective view of the lock-hook; Fig. 2, a longitudinal section of part of a round cage with the lock-hook attached, and Fig. 3 a longitudinal section of a square cage with the lock-hook in position.

The nature of my invention consists in the attachment to a bird-cage hook, or the like, of a double hinge-plate and a locking device, whereby the hook will be positively locked after the base or bottom of the cage is attached to the body, so that the hooks cannot accidentally be unhooked.

A is the body of a bird-cage, constructed in the usual manner, with horizontal bands B and a base or bottom, C. D is the cage-hook, made of a single piece of wire, or the like, and bent as shown in the several figures. It is hinged to one end of a double hinge-plate, E, and can be swung forward and backward, so as to lock or unlock the base C to the cage-body A; and it has for that purpose the projection $D^1$ and the eye $D^2$, which latter serves as a handle for convenience in operating the hook D. F is the hook-lock, consisting of a rectangular wire frame, hinged to the double plate E at such a distance from the hook D that, when it is pushed down behind the hook D, it will be slightly impinging upon the same, and in this position act as a bar or stop to the hook D, to prevent the same from being bent backward, and thus release the hook. I prefer to make this stop F of wire; but it may be made in various other ways without changing its nature.

Figure 3:
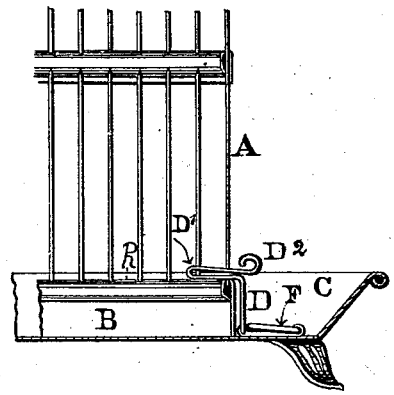

In Fig. 3 the stop F and the hook D are shown as applied to a square cage. It is usual to make the base C of that kind of cages large enough to place the hinge-plate E upon the plane surface of the base; but in round cages, having spun or stamped bottoms, there is generally not room enough to place the double hinge-plate E upon its plane surface, and it must, therefore, be put upon the raised part or edge of the bottom, and, when in such a position, the lock F cannot be pushed down upon the plate E to lock the hook D. In this case I place the hook and lock, as shown in Fig. 2, when the lock F will act as a brace against the eye $D^2$, and thus prevent the unlocking of the base.

I attach three of these lock-hooks to every round, and four to every square, cage; but any number sufficient to hold the base will answer the purpose.

The hook D is made of wire, as being the most convenient material for constructing it; but it may also be cast, or made in any other manner.

Having thus fully described my invention, I desire to secure by Letters Patent—

1. The combination, with the hook D, having the projection $D^1$ and the eye $D^2$, of the double hinge-plate E and the lock F, when the said lock F acts as a stop or brace to the hook D, substantially as and for the use and purpose set forth and described.

2. The combination, with the hook D, of the double hinge-plate E, lock F, base or bottom C, and lower horizontal band B, all when arranged to operate substantially as and for the use and purpose described.

In witness that I claim the foregoing as my invention I have hereunto set my hand this 19th day of December, 1874.

LOUIS P. REICHERT.

Witnesses:
 MICHAEL J. STARK,
 JOHN B. EDMONDS.